April 29, 1941.　　K. FEILCKE ET AL　　2,239,843
HYDRAULIC HOIST MECHANISM
Filed Aug. 5, 1939　　2 Sheets-Sheet 1

INVENTORS
K. Feilcke &
V. L. Farnsworth
BY Robb & Robb
ATTORNEYS

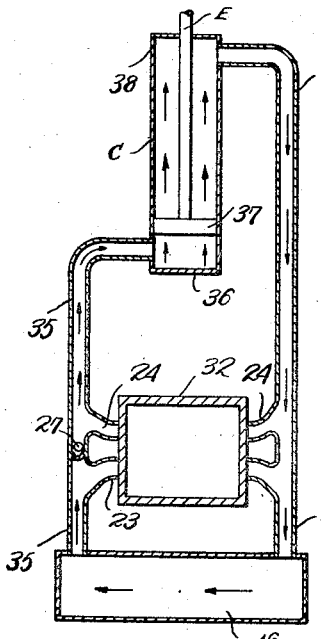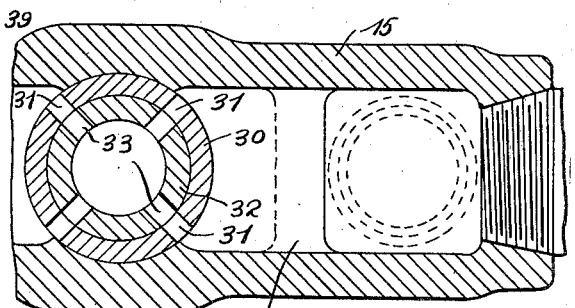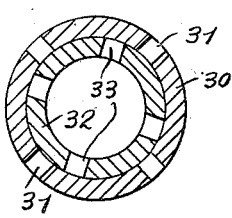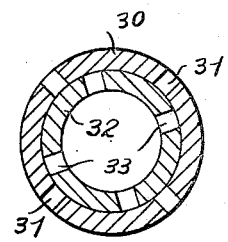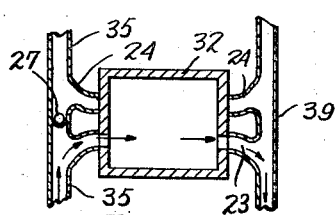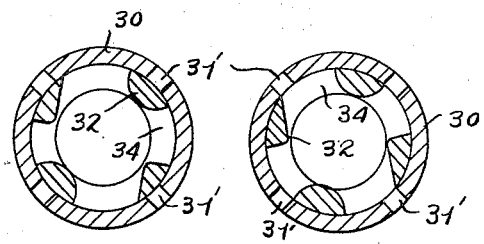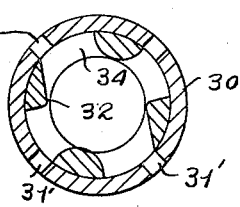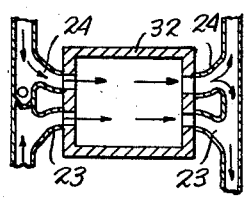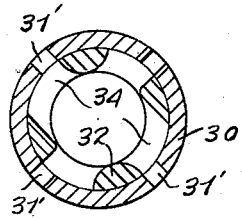

Patented Apr. 29, 1941

2,239,843

UNITED STATES PATENT OFFICE 2,239,843

HYDRAULIC HOIST MECHANISM

Karl Feilcke and Vivian L. Farnsworth, Galion, Ohio, assignors to The Perfection Steel Body Company, Galion, Ohio Application August 5, 1939, Serial No. 288,684

2 Claims. (Cl. 60—52)

This invention relates to hydraulic hoist mechanism for a dumping truck body and more particularly to an improved arrangement of a mechanism controlling the flow of hydraulic fluid to the power cylinder which is employed for imparting a hoisting movement to the truck body.

The principal object of this invention is to provide a combined pump and valve mechanism connected to the usual fluid conduits leading to opposite ends of the power cylinder with by-pass passages for by-passing fluid from the high pressure end to the low pressure end of the power cylinder and by-passing the pump with respect to the power cylinder and its associated conduits.

The invention contemplates the provision of a single valve mechanism controlling the by-pass passages to control the flow of fluid in the conduits to the power cylinder for effecting the desired movement of the truck body by the power cylinder.

The arrangement of the valve mechanism and pump provides a compact and efficient construction for effecting the desired movement of the truck body and in which the pump may be continuously operating without over-heating.

In the drawings—

Figure 4 is a diagrammatic view illustrating the position of the control valve and direction of flow of fluid for imparting a raising movement to the truck body.

Figure 5 is a view similar to Figure 4, showing the position of the control valve for holding the truck body in a desired position.

Figure 6 is a view similar to Figure 4, showing the position of the control valve during lowering movement of the truck body.

Figure 7 is a sectional view taken substantially on line 7—7 of Figure 3, illustrating the position of the control valve during lowering movement of the truck body.

Figure 8 is a sectional view taken substantially on line 8—8 of Figure 3, illustrating the position of the control valve during lowering movement of the truck body.

Figures 9 and 10 are sectional views of the control valve similar to the views shown in Figures 7 and 8 respectively, and showing the position of the control valve for holding the truck body in a desired position of elevation.

Figures 11 and 12 are sectional views respectively similar to the views shown in Figures 9 and 10, illustrating the position of the control valve for imparting a hoisting movement to the truck body.

Figure 1:
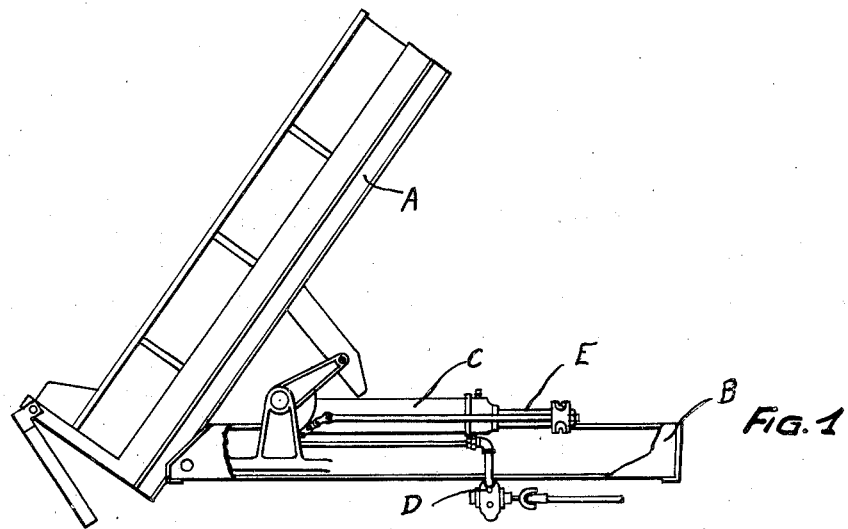
Figure 1 is a side elevation of a dumping truck body, parts thereof being broken away, illustrating the manner in which a hydraulic power device is used for imparting a tilting movement to the truck body.
Figure 2:
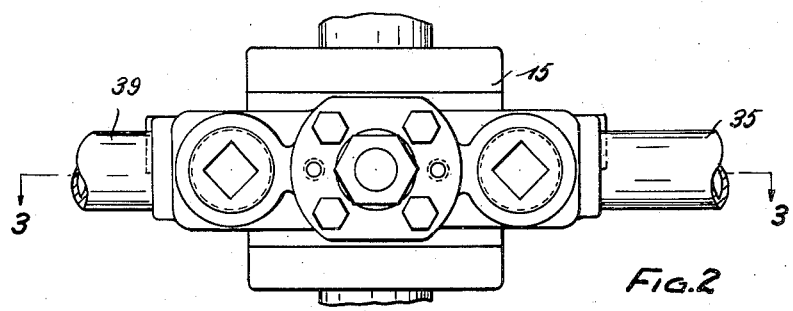
Figure 2 is a top plan view of a pump and valve mechanism unit which controls the supply of hydraulic fluid to the power cylinder shown in Figure 1.

Referring to Figure 1, A designates a dumping truck body pivotally connected to and supported by the frame B of a truck chassis, not shown. A hydraulic power cylinder C is carried by the frame B, and a pump and valve unit D is employed for supplying hydraulic fluid to the power cylinder C for effecting movement of the piston rod E. The piston rod E is connected to the truck body A for effecting pivotal movement thereof with respect to the frame B in a manner well known in the art.

The foregoing features, which are well known in the art, form no part of this invention since this invention deals principally with the construction of the pump and the valve mechanism employed for controlling the supply of hydraulic fluid to the power cylinder C.

Figure 3:
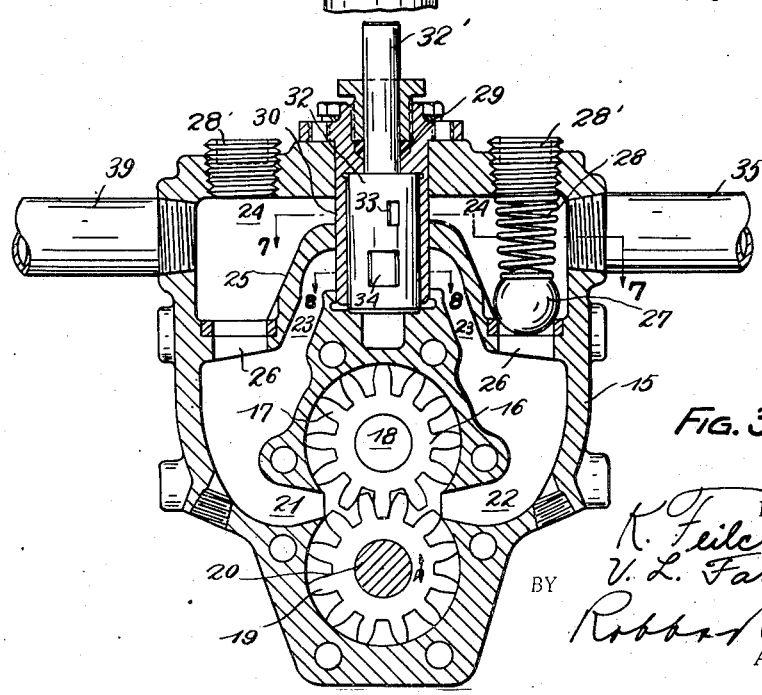
Figure 3 is a vertical sectional view taken substantially on the line 3—3 of Figure 2.

Referring to Figure 3, the numeral 15 indicates a pump casing of a rotary gear pump 16. The pump 16 comprises an idle gear 17 keyed to a shaft 18 rotatably mounted in the casing 15. A drive gear 19 is keyed to a shaft 20 which is connected by suitable means, not shown, to a drive shaft operated from the usual truck motor. The gear 19 may be driven in either direction. It is illustrated as being driven in a counter-clockwise direction to deliver hydraulic fluid from the inlet side 21 to the outlet side 22 of the pump.

The pump casing 15 is provided with a passageway 23 for by-passing hydraulic fluid from the outlet side thereof to the inlet side thereof. A passageway 24 is also provided in the pump casing 15 for by-passing fluid from the high pressure end of the power cylinder C to the low pressure end of the power cylinder C. A member 25 extends transversely of the casing 15 and separates the by-pass passages 23 and 24 from each other. A pair of openings 26 are formed in the transverse partition 25 respectively connecting the by-pass passage 24 with the inlet side 21 and the outlet side 22 of the gear pump 16. It will be noted that the by-pass passage 23 has a direct connection with both the inlet side 21 and the outlet side 22 of the pump 16.

The opening 26 connecting the by-pass passage 24 to the outlet side 22 of the pump provides a seat for a ball check valve 27. A spring 28 is employed to resiliently bias the check valve 27 to a position closing the opening 26. It will be noted that the arrangement of the parts on the outlet side 22 of the pump, with the exception of the check valve 27, is identical to the arrangement of the parts appearing on the inlet side 21 of the pump. Accordingly, if it is desired to reverse the direction of rotation of the gear 19, it is merely necessary to transfer the check valve 27 to the other side of the pump. To enable the check valve 27 to be transferred from one side to the other of the pump, removable closure members 28' are provided to permit access to the valve 27 and spring 28 for the removal and transfer thereof.

The by-pass passages 23 and 24 are opened and closed by means of valve mechanism 29 comprising a cylindrical casing 30 provided with a plurality of openings or ports 31'—31. A sleeve valve 32 is rotatably mounted within the casing 30 and is provided with a plurality of ports 33 which may be brought into and out of alignment within the ports 31 to open or close the by-pass passage 24, as desired. The sleeve valve 32 is further provided with a plurality of ports 34 which may be brought into and out of alignment with the openings 31' for closing or opening the passage 23. The sleeve valve 32 is provided with a member 32' to which an operating member, not shown, may be applied to cause movement of the valve 32 for aligning the ports 33 and 34 with the openings 31—31', as desired. It will be noted that the ports 34—31' are considerably larger than the ports 33—31 in order that fluid may be more readily by-passed from the outlet side 22 to the inlet side 21 of the gear pump.

The registering ports 33—31 of the valve and valve cage are restricted to retard the return flow of the fluid from the high pressure side of the piston to the low pressure side when lowering the dump body. The weight of the dump body, and particularly when partially loaded, imposes a considerable load upon the retreating piston, which, if permitted to descend too fast, would cause injury to the apparatus. The fluid in a lowering operation moves under considerable pressure through the valve and by-passage or cross duct 24, causing a heating of the valve which is materially reduced by interconnecting the cross duct 24 and the shunt or pump recirculating cross duct 23 through the valve. This distributes the heat uniformly throughout the valve and prevents distortion of the same.

In operation the plug valve 32 is moved to a position closing both by-pass passages 23 and 24 in order to impart hoisting movement of the truck body A. Figures 11 and 12 illustrate the position of the ports 33 and 34 with respect to the openings 31 31' during raising movement of the truck body. With the valve in this position, rotation of the shaft 20 will operate the pump 16 to deliver fluid into the outlet side 22 of the pump. The pressure created by such fluid will unseat the check valve 27 and the fluid will be transmitted through the conduit 35 connected to the high pressure end 36 of the power cylinder C. Figure 4 diagrammatically illustrates the position of the valve 32 and the flow of fluid in the system during raising movement of the truck body. The fluid transmitted to the high pressure end 36 of the power cylinder C causes upward movement of the piston 37, and the fluid in the low pressure end 38 of the power cylinder C will be returned through the conduit 39 to the inlet side 21 of the pump.

If it is desired to stop movement of the truck body A, the valve 32 is moved to connect the ports 34 with the openings 31' to permit fluid to be by-passed through the passage 23 from the outlet side 22 to the inlet side 21 of the pump. Figure 10 illustrates the position of the ports 34 with respect to the openings 31' in this position. The by-passing of fluid through the passage 23 will permit the check valve 27 to seat and close the opening 26. It will also be noted that any tendency of fluid to return through the conduit 35 to the outlet side 22 of the pump will effect a closing movement of the ball check valve 27. Upon movement of the valve 32 in this manner, fluid will be trapped in the high pressure end of the cylinder 36 to hold the truck body A in the position to which it has been raised by reason of the fact that the ports 33 would be out of alignment with the openings 31, the by-pass passage 24 remaining closed. Figure 9 illustrates the position of the ports 33 with respect to the openings 31 in the holding position.

Figure 5 diagrammatically illustrates the flow of fluid with respect to the valve 32 during the holding position, and it will be noted that in this position the inlet side of the pump will be connected with the low pressure end 38 of the cylinder C. It is important that the inlet side 21 be maintained connected with the low pressure end 38 of the cylinder while fluid is being by-passed from the high pressure side 22 to the low pressure side 21 of the pump in order to prevent the pump from over-heating.

If it is desired to lower the truck body from a position to which it has been raised, the valve 32 is moved to align the ports 33 and 34 with the openings 31 and 31' respectively as illustrated in Figures 7 and 8. In this position both the by-pass passages 23 and 24 will be open as illustrated diagrammatically in Figure 6, thereby permitting fluid to be by-passed with respect to the pump from the high pressure end 36 through the by-pass passage 24 to the low pressure end 38 of the cylinder. At the same time fluid from the pump will be by-passed through the passageway 23, the inlet side 21 of the pump remaining connected with the low pressure end 38 of the power cylinder C. The weight of the body A will be sufficient to force the fluid from the high pressure end 36 of the cylinder through the pipe 35, passage 24, and pipe 39, to the high pressure end 38 of the cylinder. During lowering movement of the truck body, the check valve 27 will be seated in the same manner as described in connection with Figures 5 and 10.

Referring to Figures 7 to 12, it will be noted that the ports 33 and 34 in the plug valve 32 have been arranged in a manner to permit movement of the valve from the holding position shown in Figures 9 and 10, in one direction to the raising position shown in Figures 11 and 12, and in the opposite direction to the lowering position shown in Figures 7 and 8. This arrangement of the valve 32 is very desirable since it permits accurate control of the position of the tiltable truck body. It is thereby possible to move the valve from the holding position directly to a lowering position without traversing the raising position and thereby causing an undesired movement of the tiltable truck body.

From the foregoing it will be apparent that the arrangement of the by-pass passages 23 and 24 and a single valve mechanism controlling these passages provides a simple and efficient means for effectively controlling the raising, holding, and lowering movements of a tiltable truck body.

When the valve is set for either a holding or return operation of the piston, the pump continues operation at its full capacity but is functionless for supplying fluid under pressure to the high pressure end of the cylinder as its outlet or delivery side through the valve is in direct connection with the intake side. The intake side of the pump is also in direct communication with the low pressure end of the cylinder to avoid confining the fluid solely in the recirculating passage or duct which would cause a heating of the fluid, churning and expanding the same, resulting in injury to the pump. The intake of the pump thus connects with the low pressure supply or side of the piston as well as with the delivery side of the pump, which permits the pump to take in a proportional volume of fluid from the low pressure end or provide for the escape to the low pressure end of the cylinder of a proportional amount of the recirculated fluid, thereby avoiding overheating of the pump fluid or pump. This is of material advantage and of benefit to the pump, and avoids developing confined excessive pressures within the pump during a holding or lowering operation.

Having thus described our invention, what we claim as new and desire to secure by Letters Patent of the United States, is:

1. A gear pump, comprising, a casing having a pump chamber for intermeshing gears, a pair of intermeshing gears rotative within said chamber, a pair of main passages respectively as intake and delivery relatively at opposite sides of said pump chamber, each at one end in communication with said chamber, a valve seat for a check valve respectively sub-dividing each of said passages, a check valve for one of said passages when functioning for fluid delivery engageable with the seat therein to withhold back-flow of fluid to the pump chamber, said check valve being transferable to the other passage for engaging with the seat therein to alternate the passages for fluid intake and delivery, by-passages respectively intermediate said main passages in communication therewith and relatively at opposite sides of said valve seats in said passages, and a valve traversing said by-passages to independently and conjointly control the same.

2. In an apparatus of the character disclosed, a cylinder, a piston therein, a gear pump, the pump comprising a casing having a pump chamber, a pair of main passages respectively as intake and outlet relatively at opposite sides of the pump chamber and in communication therewith, the intake passage connecting with the low pressure end of the cylinder at one side of the piston, and the outlet passage connecting with the high pressure end of the cylinder at the opposite side of the piston, and a pair of independent cross passages interconnecting said intake and outlet main passages, one thereof for interconnecting said pair of main passages by-passing the pump chamber, and the second interconnecting said main passages to provide a pump recirculating passage with the intake in constant communication with the low pressure end of the cylinder, a check valve within said casing interposed in the outlet passage intermediate said pair of cross passages for withholding back-flow of fluid from the high pressure end of the cylinder, said check valve transferable into the intake passage to alternate the passages for intake and outlet for a reversal of the direction of rotation of the gear pump, and a valve for said pair of cross passages to independently and conjointly control the same.

KARL FEILCKE.
VIVIAN L. FARNSWORTH.